United States Patent [19]

Guidry

[11] 4,144,194
[45] Mar. 13, 1979

[54] ZEOLITE PROMOTED HYDROCARBON CONVERSION CATALYSTS

[75] Inventor: Hanson L. Guidry, Bel Air, Md.

[73] Assignee: W. R. Grace & Co., New York, N.Y.

[21] Appl. No.: 521,819

[22] Filed: Nov. 7, 1974

Related U.S. Application Data

[63] Continuation-in-part of Ser. No. 350,186, Apr. 11, 1973, abandoned, which is a continuation-in-part of Ser. No. 230,159, Feb. 28, 1972, abandoned, which is a continuation of Ser. No. 23,013, Mar. 26, 1970, abandoned.

[51] Int. Cl.$^2$ .......................... B01J 29/06; B01J 29/00
[52] U.S. Cl. ................................. 252/451; 252/455 Z
[58] Field of Search ............................ 252/451, 455 Z

[56] References Cited

U.S. PATENT DOCUMENTS

| 3,410,808 | 11/1968 | Smith et al. | 252/453 |
| 3,449,265 | 6/1969 | Gladrow et al. | 252/455 Z |
| 3,650,988 | 3/1972 | Magee, Jr. et al. | 252/451 |

Primary Examiner—Carl Dees
Attorney, Agent, or Firm—Arthur P. Savage

[57] ABSTRACT

A zeolite promoted hydrocarbon conversion catalyst prepared by combining Y-type zeolite and a silicate containing mother liquor obtained as a by-product in the preparation of Y-type zeolite with clay and inorganic amorphous matrix forming components. The catalyst composition is preferably exchanged with rare earth and/or hydrogen ions and utilized in the cracking of hydrocarbons.

4 Claims, No Drawings

ZEOLITE PROMOTED HYDROCARBON CONVERSION CATALYSTS

This application is a continuation-in-part of my application Ser. No. 350,186, filed Apr. 11, 1973, which is a continuation-in-part of my application Ser. No. 230,159, filed Feb. 28, 1972, which is a continuation of Ser. No. 23,013, filed Mar. 26, 1970 all now abandoned.

The present invention relates to the preparation of hydrocarbon conversion catalyst, and more specifically to an improved economical procedure for preparing zeolite promoted hydrocarbon cracking catalysts wherein silicate solution obtained as a by-product in the preparation of synthetic faujasite (Y-type zeolite) is utilized in preparing the amorphous matrix portion of the catalyst.

In recent years, many zeolite promoted hydrocarbon conversion catalysts have been prepared by combining crystalline alumino silicates, such as faujasite, with inorganic matrix forming components, such as silica, alumina, silica-alumina, and clay. To date, the preferred method for preparing zeolite containing catalysts involves preparation of a crystalline zeolitic component (usually faujasite), modifying the zeolite to enhance its thermal stability and catalytic activity properties, and incorporating the modified zeolite into an appropriate inorganic matrix.

Preparation of Y-type zeolite on a commercial scale generally involves reacting silica, alumina, and alkali metal in the presence of water at elevated temperatures. The crystalline faujasite is then removed from the reaction mixture which comprises a slurry of finely divided faujasite crystals suspended in an aqueous solution of excess silica and sodium hydroxide. In the ordinary commercial production of faujasite, the excess silica and alkali metal in the liquid phase of the reaction slurry is discarded as by-product mother liquor. This discarded silica containing solution represents both a disposal problem and a considerable economic loss.

It has been suggested that the excess silica, alkali metal solution produced as a by-product from faujasite synthesis could be incorporated in an amorphous silica-alumina catalyst synthesis along with the faujasite zeolite produced thereby. It has been found however that catalysts prepared by the gelations of alkali metal silicate containing mother liquor in combination with the zeolite possess relatively poor activity.

It is therefore an object of the present invention to provide an improved method for preparing a zeolite promoted hydrocarbon conversion catalyst.

It is another object to provide a method for preparing a commercially valuable faujasite containing hydrocarbon cracking catalyst wherein by-product alkali metal silicate solutions obtained from the synthesis of Y-type zeolite are fully utilized.

It is a further object to provide a commercially aluable zeolite promoted hydrocarbon cracking catalyst which contains an amorphous matrix prepared from excess sodium silicate solution obtained from the manufacture of Y-type zeolite having a silica to alumina ratio in excess of about 3.0.

These and still further objects of the present invention will become readily apparent to one skilled in the art from the following detailed description and specific examples.

Broadly, my invention contemplates a catalyst manufacturing process wherein a sodium Y-type zeolite having a silica to alumina ratio in excess of about 3 is prepared by reacting aqueous solution of alkali metal silicate, aluminate and hydroxide, and subsequently the raw sodium alkali metal Y-type zeolite and its mother liquor by-products are combined with appropriate amounts of clay, amorphous matrix forming materials and zeolite modifying components to form a zeolite promoted cracking catalyst.

More specifically, I have found that a commercially valuable crystalline zeolite promoted hydrocarbon cracking catalyst may be prepared by the following outlined procedure:

1. An alkali metal Y-type zeolite having a silica-alumina ratio of from about 3.0 to 6.0 is prepared by reacting silicate, aluminate, in aqueous alkali metal hydroxide solution. As a result of this reaction, a Y-type zeolite containing reaction mixture is obtained which contains zeolite crystals suspended in an aqueous solution of mother liquor which contains up to 50 gms. per liter $Na_2O$ and 100 gms. per liter $SiO_2$ dissolved therein.

2. The zeolite is then separated from its mother liquor.

3. The mother liquor is combined with additional silicate, and a desired quantity of clay, and then gelled by lowering pH thereof to from about 12.0 to 10.5 by the addition of carbon dioxide or mineral acid.

4. The gelled mixture is combined with sufficient sodium aluminate to provide from about 5 to 40 percent by weight of the alumina present in the synthetic portion of the amorphous inorganic matrix present in the finished catalyst.

5. The reaction mixture is aged for a period of from about 0.25 to 1.0 hours at a temperature of 70° to 125° F.

6. The aged mixture is then combined with sufficient aluminum salt solution (preferably alum solution) to provide the remaining alumina required in the synthetic portion of the matrix of the finished catalyst.

7. The pH of the mixture is adjusted from about 5.5 to 7.5 by the addition of ammonia and filtered to recover the catalyst solids therein.

8. The zeolite recovered in step 2 is added to the above mixture.

9. The recovered catalyst solids are reslurried with water, spray dried, and washed to remove soluble impurities.

10. The composition is then exchanged with rare earth chloride solution at a pH of from about 4.5 to 5.0, and/or if desired, exchanged with acidified decationized water at a pH of about 2.5 to 3.5.

The zeolite utilized is preparing the catalyst comtemplated herein is Y-type zeolite which is sometimes referred to an synthetic faujasite. The zeolite will preferably possess a silica to alumina ratio on the order of from about 3.0 to 6.0 and may be prepared using conventional Y-type zeolite preparation techniques fully described in the prior art. In a typical Y-type zeolite synthesis, reagents which will provide silica, alumina and alkali metal, are combined in the following broadly defined ratios:

$Na_2O/SiO_2$: 0.3 to 0.7
$SiO_2/Al_2O_3$ : 6 to 20
$H_2O/Na_2O$: 25 to 60

The above defined reaction mixtures are heated at temperatures of from about 25° to 220° F. at times ranging from about 4 hours to 60 days.

Typical prior art Y-type zeolite preparation techniques are set forth in U.S. Pat. No. 3,130,007 to Breck and Ser. No. 738,116, filed 6/19/68 by Maher et al.

As a result of these syntheses, Y-type zeolite is obtained in essentially 97 percent yield based on the alumina present in the reaction mixture. The mother liquor contained in the reaction mixture, however, will contain excess unreacted alkali metal silicate in amounts which will range from about 25 to 50 gms. $Na_2O$ per liter and 50 to 100 gms. $SiO_2$ per liter. In preparing Y-type zeolite by conventional commercial processes, sodium silicate solution is utilized as a source of silica. The solutions will contain from about 200 to 300 gms $Na_2O$ per liter and from about 600 to 900 gms $SiO_2$ per liter. While any soluble aluminum salt may be utilized in the commercial synthesis of faujasite, sodium aluminate is preferably utilized in amounts which will provide the above generally described concentrations. While the present description frequently refers to the use of sodium aluminate and sodium silicate, it should be understood that other alkali metal ions may be present such as potassium.

In the practice of the present invention the catalyst prepared will contain a substantial portion of clay. Clays which may be included in the catalyst composition are kaolinite, halloysite, montmorillonite, anauxite, dickite, and nacrite. The clays may be utilized in their naturally occurring form or may be thermally modified if desired. The finished catalyst prepared by the procedure set forth in this invention preferably contains from about 15 to 50 percent, and preferably at least 20 percent by weight of the clay ingredient.

To prepare the presently contemplated catalyst, the silicate containing mother liquor obtained from the zeolite synthesis is separated from the zeolite product and combined with clay ingredient. Additional silicate is added if required, and subsequently the silicate is gelled by reducing the pH from an initial level of about 12 down to a pH of from about 10.0 to 10.7. The amount of additional silicate added to the mother liquor will depend upon the amount of silica desired in the amorphous matrix. Generally, additional silicate may be added to adjust the $SiO_2$ concentration to a maximum of about 60 g. per liter. The lowering of the pH is achieved by the addition of carbon dioxide or a mineral acid such as sulfuric or hydrochloric acid. The amount of gelling agent, i.e., acidic reagent, is that which will provide a gel time of the silicate of about 0.5 to 5.0 minutes at a temperature of 70° to 125° F. The gel time is determined by obtaining samples of acidified silicate and observing the time required to form a firm gel. In commercial practice the gelling is obtained by adding the carbon dioxide or acid gelling agent to a silicate solution or slurry and recirculating the slurry in a gelling tank for the period required to obtain the desired gel formation.

Subsequent to gelling, sodium aluminate solution is added which will contain from about 1.4 to 4.2 moles $Na_2O$ per liter, and about 1.0 to 3.0 moles $Al_2O_3$ per liter. The aluminate is added in sufficient quantity to the gelled mixture to provide from about 5 to 40 percent of the alumina present in the matrix of the finished catalyst. The aluminate is an essential ingredient in that it maintains a surface area of 150 to 300 $m^2/g$ in the finished catalyst insuring a pore size distribution which improves the hydrothermal stability of the finished catalyst.

Subsequent to the addition of sodium aluminate and aging, a solution of aluminum salt, preferably alum, is added to provide sufficient aluminum ion to form the amount of alumina desired in the finished catalyst composition. In general, it is desired that the synthetic portion of the catalyst matrix contain from about 25 to 40 percent by weight synthetic alumina.

Subsequent to the addition of the soluble aluminum salt, the pH of the reaction mixture is adjusted to a level of from about 5.5 to 7.5 by the addition of ammonium ion. Subsequent to the addition of ammonium ion, the zeolite product, which was initially separated from the mother liquor, is combined with the reaction mixture. The catalyst solids are then recovered by filtration, and spray dried at a temperature of from about 250° to 350° F. to obtain catalysts in the form of microspheres having average diameters ranging from about 50 to 70 microns. The spray dried catalyst is subsequently preferably exchanged with solutions of ammonium ion to lower the soda ($Na_2O$) content to below 0.5 percent by weight.

In one preferred practice of the invention, the catalyst is then subjected to rare earth ion exchange using aqueous solution of rare earth salts, preferably rare earth chloride. The rare earth exchange procedure is continued until up to about 4.0 percent by weight rare earth ($RE_2O_3$) and preferably 2.0 to 4.0 is incorporated in the catalyst compositions.

In a second preferred practice of the invention, the catalyst is subjected to a hydrogen ion exchange in lieu of the aforementioned rare earth exchange. The preferred method for exchanging the catalyst with hydrogen ions involves contacting the low soda composition with decationized acidified water which possesses a pH of about 2.5 to 3.5, and preferably 2.8 to 3.5. The decationized acidified water is conveniently obtained by subjecting city water to a conventional demineralization step wherein the majority of the ions present are removed by ion exchange and hydrogen ions are substituted therefore. Decationized water or "cat water" prepared by contacting municipal water with conventional acid ion exchanged resins will possess a desired pH of about 2.5 to 3.5 and a low concentration of metal cations. The preferred exchange procedure involves mixing the spray dried catalyst composition, which may or may not have been previously ammonium sulfate or carbonate exchanged, with acidified water at a temperature of 100° to 200° F. and preferably 150° to 170° F. for a period of up to 1 hour. This slurrying procedure is frequently repeated 2 to 4 times.

Subsequent to rare earth or hydrogen (acid) exchange the catalyst is dried at a temperature of from about 300° to 350° F. to lower the moisture content to a level of from about 60 to 15 percent.

The catalyst obtained by way of the present procedure will contain from about 10 to 35 percent by weight Y-type zeolite measured on a silica-alumina basis. The remainder of the catalyst, which ranges from about 65 to 90 percent, will comprise an essentially amorphous inorganic matrix. This matrix preferably contains from about 15 to 50 percent by weight clay and from about 40 to 60 percent by weight synthetic silica-alumina. This synthetic silica-alumina portion in turn contains from about 25 to 40 percent by weight $Al_2O_3$, the remainder being essentially $SiO_2$.

In another preferred practice of this invention, the present catalysts are exchanged with rare earth salt solution so as to provide up to about 4.0 percent by weight rare earth oxides in the finished catalyst composition. The catalysts will possess an attrition ranging from about 20 to 40 based on the Davison Attrition Index and possess catalytic activity ranging from about 83 to 92 as determined by typical microactivity tests.

Having described the basic aspects of the present invention, the following examples are given to illustrate specific embodiments thereof.

EXAMPLE I

A sodium Y-type zeolite slurry was prepared as follows:

1. A sodium silicate solution containing 17.6 percent by weight $SiO_2$ was prepared by diluting 3360 gallons of 30.7° Be sodium silicate with 1000 gallons of water. A sodium aluminate solution was prepared by dissolving 1225 lbs. of aluminum trihydrate, $Al(OH)_3$, in 1830 lbs. of 50 percent by weight NaOH solution, then diluting the mixture to 450 gallons by addition of water. The sodium silicate and sodium aluminate solutions were combined and agitated for one hour at room temperature.

2. A zeolite seeding (nucleation center) mixture was prepared by reacting 1295 lbs. of 50 percent by weight NaOH solution, 1214 lbs. of water, 110 lbs. of aluminum trihydrate, $Al(OH)_3$, and 2841 lbs. of 30.7° Be sodium silicate solution (containing 21.6 percent by weight $SiO_2$). This mixture was mixed and maintained at a temperature of 70° to 100° F. for about 26 hours.

3. The seeding mixture prepared in (2) above was combined with the sodium silicate-aluminate mixture of (1) above, and the mixture was agitated for 45 to 60 minutes. The mixture was then heated to about 212° F. and maintained at about 206° F. for 6 to 12 hours to produce a slurry of Y-type zeolite crystals in mother liquor. The reaction slurry is then diluted with sufficient quench water to produce a volume of about 8,000 to 10,000 gallons of slurry having a temperature of about 160° F.

About 45 gallons of the above prepared sodium Y-type zeolite slurry which contained 22.32 grams per liter $Na_2O$ and 43 grams per liter of unreacted $SiO_2$, and a total of about 5.1 lbs. of sodium Y type molecular sieve having a silica alumina ratio of about 5.2 were combined with 13,950 grams of kaolin having 14.1 percent total volatiles. The clay sieve silicate slurry was pumped at a rate of one gallon per minute through a heated reaction coil into which $CO_2$ gas was passed at a rate such that gelation of the stream exiting therefrom occurred in five minutes at a temperature of 85° F. The gelled reaction mixture having a pH of 10.7 was combined with 1000 grams of sodium aluminate solution which contained 1.4 moles $Na_2O$ per mole $Al_2O_3$ and contained a total of 200 grams of $Al_2O_3$. This mixture, which possessed a pH of 11.4, was aged for 47 minutes at 45° F. whereupon 967 l. alum solution containing 100 grams per liter $Al_2O_3$ were added to the mixture to produce a pH of 5.5. The pH was adjusted to 7.5 adding 0.70 l. of 23 percent ammonium hydroxide solution. The slurry was filtered to obtain 105 pounds of filtercake which was reslurried with 8 liters of water, and then homogenized. The homogenized slurry was spray dried to obtain a microspheroidal product containing 25.7 percent by weight total volatiles. 350 g. of spray dried product was then washed with ammonium sulfate solution at a pH of about 7 to 7.5. The washed filtercake was then reslurried with 0.75 l. of water and the pH was adjusted to 5.0 using 45 ml. of 6 percent sulfuric acid. This slurry was then exchanged with a rare earth chloride solution which contained 20 grams rare earth chlorides dissolved in 0.40.1 of water. The pH of the rare earth chloride solution was adjusted to about 2.3 with HCl. The catalyst filtercake exchanged with a rare earth chloride solution for 30 minutes at temperature of about 160° F. The pH of the slurry was maintained between about 4.5 and 5.25 by the appropriate addition of sulfuric acid. The exchanged catalyst was then recovered by filtration and dried at a temperature of 300° F. The final catalyst contained 2.92 percent by weight $Re_2O_3$, 17.1 percent by weight faujasite (silica-alumina basis), 44.2 percent by weight clay, and 38.7 percent by weight silica-alumina which contained 26.0 percent by weight $Al_2O_3$.

EXAMPLE II

A sodium Y-type zeolite was prepared using the procedures set forth in Example I.

The zeolite was separated from the silicate containing mother liquor by filtration to obtain a mother liquor containing 22.6 grams per liter $Na_2O$ and 43 grams per liter $SiO_2$. 45 gallons of the mother liquor was combined with 13,950 grams of kaolin. The clay mother liquor slurry was then pumped at a rate of 1 gallon per minute through a heated reaction coil into which carbon dioxide was passed at a rate such that the gelation of the stream passing therefrom occurred in 5 minutes at 85° F. The gelation was continued for 25 minutes to obtain a gelled stream possessing a pH of 10.7. The gelled mixture was combined with 1,860 grams of sodium aluminate solution which possessed an $Na_2O$ to $Al_2O_3$ ratio of 1.4. The sodium aluminate solution contained a total 372 grams of alumina. The resulting slurry possessed a pH of 11.7 whereupon the batch size was adjusted to 75.6 liters. After aging the mixture for 47 minutes at 85° F., 18.0 l. of alum solution containing 100 grams $Al_2O_3$ per liter was added to obtain a mixture having a pH of 4.1. The pH was adjusted to 7.7 by the addition of 34 ml. of 23 percent ammonium hydroxide solution. Subsequently, 8.5 pounds washed sodium Y-type zeolite cake obtained from the zeolite synthesis was added. This cake contained 37.32 percent solids. The mixture was recirculated and agitated for one hour and then filtered to obtain 113 pounds of catalyst filtercake. This filtercake was reslurried with 8 liters of water, then homogenized and spray dried at a temperature of 250° F. The spray dried product weighed 34 pounds. This mixture was then exchanged with ammonium sulfate solution at a pH of about 7.5 to obtain a product which contained 0.5 percent by weight $Na_2O$. The exchanged filtercake was reslurried with water and the pH thereof was adjusted to 5.0 by the addition of 6 percent sulfuric acid. The reslurried material was then exchanged with a rare earth chloride solution which contained 15 grams $RECl_3$ dissolved in 350 ml. of water, the pH being 2.8 adjusted with hydrochloric acid. The filtercake was exchanged with a rare earth chloride solution at a temperature of 160° F. for a period of 30 minutes, the pH being adjusted to about 5.0. The resulting product was then dried at a temperature of 300° F. to obtain a catalyst having the following analysis:3.27 percent $RE_2O_3$, 15.7 percent Y-type zeolite (silica-alumina basis), 41.8 percent clay, 42.5 percent silica-alumina synthetic silica-alumina hydrogel containing 40.0 percent by weight $Al_2O_3$.

EXAMPLE III

A sodium Y-type zeolite was prepared using the procedure set forth in Example I.

The zeolite was separated from the silicate containing mother liquor by filtration. The mother liquor was combined with 24.5 lbs. of sodium silicate solution containing 28.7 percent SiO$_2$ and 8.7 percent Na$_2$O to make 45 gallons of silicate and mother liquor mixture containing 18.7 grams per liter Na$_2$O and 43 grams per liter SiO$_2$. The 45 gallons mixture was combined with 4820 grams of kaolin. The liquor slurry was then pumped at a rate of 1 gallon per minute through a heated reaction coil into which carbon dioxide was passed at a rate such that gelation of the stream occurred in 2 minutes at 80° F. The gelation was continued for 25 minutes to obtain a gelled stream possessing a pH of 10.2. The gel mixture was aged for 5 minutes while the volume was adjusted to 75.6 liters. 10.6 liters of alum solution containing 100 g/l Al$_2$O$_3$ were added to obtain a pH of 4.2. The pH was adjusted to 7.5 by the addition of 1900 ml. of 23 percent ammonia. Subsequently 8.82 pounds washed sodium zeolite cake obtained from the faujasite synthesis was added. This cake contained 32.55 percent solids. The mixture was recirculated and agitated for an hour and then filtered to obtain 98 pounds of catalyst filter cake. The cake was reslurried with 9 liters of water then homogenized and spray dried at a temperature of 200° F.

730g. of spray dried product was then exchanged with ammonium sulfate solution at a pH of about 7.5 to obtain a product which contained 0.5 percent by weight Na$_2$O. The exchanged filter cake was reslurried with water and the pH thereof was adjusted to 5.0 by the addition of 6 percent H$_2$SO$_4$. The reslurried material was then exchanged with rare earth chloride solution which contained 67.5 grams RECl$_3$, 6H$_2$O dissolved in 1460 ml of water, the pH being 3.0 adjusted with HCl. The filter cake was exchanged with a rare earth chloride solution at a temperature of 160° F. for a period of 30 minutes. The resulting product was filtered and rinsed with water, then dried at a temperature of 300° F. to obtain a catalyst having the following analysis: 3.02 percent RE$_2$O$_3$, 15.7 percent Y-type zeolite (silica-alumina basis) 24.3 percent clay, 60 percent synthetic silica-alumina hydrogel containing 25.0 percent by weight Al$_2$O$_3$.

EXAMPLE IV 268 grams (dry basis) of spray dried material such as prepared in previous Example III is reslurried in 1530 ml. of hot city water (160° F.) and the pH was adjusted to 4.4–4.5 with ammonia. The material was dewatered and exchanged twice with 403 ml. of dilute (1.5 wt. percent) ammonium sulfate solution. The composition is then dewatered then subjected to 4 separate exchanges with 403 ml. of decationized water (cat water) which possessed a pH of 2.8–3.5. The decationized water was obtained by subjecting city water to decationization in an acid ion exchanged resin apparatus wherein hydrogen ions were exchanged from metal cations originally present in the water. Each exchange with cat water was conducted for a period of 20 minutes at 160° F. Subsequent to each cat water exchange the catalyst slurry was dewatered. The final product was then dried for 1 hour at 300° F.

EXAMPLE V

The procedure set forth in Example IV was repeated, however the ammonium sulfate exchanges after spray drying were replaced with two cat water exchanges.

EXAMPLE VI

To illustrate the catalytic activity of the catalyst prepared by way of Examples I, II, III, and IV, the following data was obtained:

| Deact-ivation | 1050° F. Steam 60 psig - 24 hrs. | | | 1350° F. Steam 15 psig - 8 hrs. | | |
|---|---|---|---|---|---|---|
| | Micro-activity | COF* | HPF** | Micro-activity | CPR | HPF |
| Example I | 83.7 | 28 | 16 | 84.5 | .38 | .11 |
| Example II | 92.7 | .46 | .19 | 89.9 | .54 | .13 |
| Example III | 90.0 | .48 | .17 | — | — | — |
| Example IV | 79.5 | — | — | — | — | — |

*Carbon Producing Factor
**Gas Producing Factor

The method used to develop the above data is described in Ciapetta et al., Oil & Gas Journal, Oct. 16, 1967. The above data reveals that the catalyst of Example I, which was prepared by gelling the silicate component in the presence of the zeolite, possessed considerably less activity than the catalyst of Example II and III. In Example II and III the catalysts were prepared using the method of the present invention, wherein the zeolite is added to the catalyst composition subsequent to the gelations of the silicate component. Furthermore, it is noted that the catalyst of Example IV which is also prepared using the method of this invention, possesses very good activity even though expensive rare earth ions are not present.

What is claimed is:

1. A method for preparing a zeolite promoted hydrocarbon cracking catalyst comprising a zeolite dispersed in an inorganic matrix, which comprises:
   (a) preparing an alkali metal faujasite having a silica-alumina ratio of from about 3.0 to 6.0 by reacting silicate, aluminate, in aqueous alkali metal hydroxide solution to obtain a reaction mixture containing zeolite crystals suspended in an aqueous solution of mother liquor which contains 25 to 50 gms. per liter Na$_2$O and 50 to 100 gms. per liter SiO$_2$ dissolved therein,
   (b) separating the zeolite from its mother liquor,
   (c) combining the mother liquor with additional silicate, and a desired quantity of clay, and then gelling by lowering pH thereof to from about 12.0 to 10.5 by the addition of carbon dioxide or mineral acid;
   (d) adding a sufficient quantity of sodium aluminate to the reactant mixture to provide from about 5 to 40% of the alumina present in the matrix of the finished catalyst;
   (e) aging the gelled silicate mixture for a period of from about 15 to 60 minutes at a temperature of 70° to 125° F.;
   (f) adding an aluminum salt to the aged mixture and adjusting the pH to from about 5.5 to 7.5;
   (g) adding sodium Y-type zeolite to the gelled reaction mixture;
   (h) washing said composition to remove soluble impurities;
   (i) exchanging said composition with a solution of rare earth ions having a pH of 4.5 to 5.25; and
   (j) recovering the catalyst product.

2. The method of claim 1 wherein said catalyst contains 10 to 35 percent by weight Y-type zeolite.

3. The method of claim 1 wherein the matrix contains 15 to 50 percent by weight clay.

4. The method of claim 1 wherein the matrix contains from about 40 to 60 percent by weight synthetic silica-alumina hydrogel which contains from about 25 to 40 percent by weight Al$_2$O$_3$.

* * * * *